United States Patent [19]
Garrett et al.

[11] Patent Number: 5,729,983
[45] Date of Patent: Mar. 24, 1998

[54] STORAGE OF PERISHABLE FOODSTUFFS

[75] Inventors: Michael Ernest Garrett, Woking; Richard Tomlins, Oxon; John Robert Coates, Farnham; Michael John Heywood, Farnborough; Trevor Dane Hudson, Fleet, all of England; Mark Joseph Kirschner, Morristown, N.J.

[73] Assignee: The BOC Group plc, Windlesham Surrey, England

[21] Appl. No.: 789,587

[22] Filed: Jan. 24, 1997

Related U.S. Application Data

[63] Continuation-in-part of Ser. No. 354,972, Dec. 13, 1994, abandoned.

[30] Foreign Application Priority Data

Dec. 13, 1993 [GB] United Kingdom ............ 932541

[51] Int. Cl.[6] ................................................ F17C 11/00
[52] U.S. Cl. ...................... 62/46.1; 62/52.1; 62/64; 62/239
[58] Field of Search ........................... 62/46.1, 52.1, 62/64, 239

[56] References Cited

U.S. PATENT DOCUMENTS

| | | | |
|---|---|---|---|
| 2,479,840 | 8/1949 | Johnson et al. | 62/239 |
| 3,269,133 | 8/1966 | Dixon | 62/52.1 |
| 3,287,925 | 11/1966 | Kane et al. | 62/52.1 |
| 4,697,508 | 10/1987 | Tallafus | 99/517 |
| 4,833,892 | 5/1989 | Wassbauer et al. | 62/78 |

FOREIGN PATENT DOCUMENTS

| | | |
|---|---|---|
| 0181563 | 5/1986 | European Pat. Off. |
| 0235119 | 9/1987 | European Pat. Off. |
| 47-003671 | 3/1972 | Japan |
| 56-011746 | 2/1981 | Japan |
| 57-179554 | 1/1982 | Japan |

*Primary Examiner*—Ronald C. Capossela
*Attorney, Agent, or Firm*—Coleman R. Reap; Salvatore P. Pace

[57] ABSTRACT

A container (10) for the storage of perishable foodstuffs is chilled by means of a liquefied gas comprising a mixture of oxygen and nitrogen which when totally vaporised has an oxygen concentration of between 15 and 22%, the remaining concentration being substantially of nitrogen. Such an atmosphere is breathable, and hence avoids the problems associated with non breathable chilling atmospheres.

8 Claims, 2 Drawing Sheets

STORAGE OF PERISHABLE FOODSTUFFS

This application is a continuation-in-part of U.S. Ser. No. 08/354,972, filed on Dec. 13, 1994, now abandoned.

BACKGROUND OF THE INVENTION

The present invention relates to the storage of perishable foodstuffs and relates particularly, but not exclusively, to the generation and use of cryogenic atmospheres for said storage.

Presently know cryogenic storage arrangements comprise a source of liquid nitrogen which, in operation, is introduced in a vaporised or liquid state into a container in which perishable foodstuff is stored. The liquid/vapour acts to chill the contents of the container and is used in conjunction with a suitable control circuit to maintain the foodstuff within an acceptable temperature range during storage, transportation or freezing.

One of the problems associated with the use of nitrogen to generate a chilling atmosphere resides in its non breathable nature. Operators can only enter the container after the introduction of oxygen therein often by opening the doors and waiting several minutes so that air penetrates the container or after donning a breathing apparatus. Clearly, both these steps are inconvenient, time consuming and can be expensive. If an operator enters the container without firstly implementing one of the safety steps, he is likely to be overcome by the lack of oxygen and could die if he is not quickly removed to a normal atmosphere.

Other cryogenic storage arrangements are known in which a combination of liquid nitrogen and liquid oxygen are used to create a cold 'breathable' atmosphere within a storage container. Such systems, however, require the use of two separate storage tanks and the provision of separate metering and control systems so as to ensure the oxygen content within the container remains sufficiently high as to enable an operator to survive therein and also sufficiently low as to ensure it does not create a fire hazard.

It is an object of the present invention to provide a safe cryogenic gas and an apparatus for dispensing the same which reduces and possibly overcomes the problems associated with the above mentioned arrangements.

SUMMARY OF THE INVENTION

Accordingly, the present invention provides a liquefied gas for use in temperature control, the liquefied gas comprising a combined mixture of liquefied oxygen and nitrogen for storage in the same container, said liquefied gas when totally vaporised having an oxygen concentration of between 15% and 22% by volume, the remaining concentration being substantially of nitrogen.

Preferably, the liquefied gas, when totally vaporised, has an oxygen concentration of between 16 percent and 21 percent by volume.

In a particularly advantageous arrangement, the liquid gas comprises substantially 15 percent oxygen by volume which when fully vaporised has an oxygen concentration of substantially 18 percent by volume.

The gas may be used in temperature control of perishable food product and may be used in a road transportable chilling apparatus.

In another aspect of the present invention, there is provided an apparatus for the storage of the liquefied gas as detailed above, the apparatus comprising a storage container for storing said gas in liquid form, one or more spray nozzles for vaporising said liquid gas so as to produce a breathable gas having an oxygen concentration of between 18% and 22% and means for directing the atmosphere into the storage container.

A preferred aspect of the invention is a process comprising the following steps.

(a) forming an oxygen- and nitrogen-containing liquid mixture comprising between 15 and 18 mole percent oxygen, i.e. greater than 15 but less than 18 mole percent oxygen;

(b) subjecting the liquid mixture to conditions which cause oxygen enrichment of the mixture;

(c) refrigerating a perishable goods storage compartment by vaporizing the liquid mixture thereinto while the oxygen concentration of the liquid mixture is less than 22 mole percent.

Events that may cause oxygen enrichment of the gas mixture include activities which cause boiling of the mixture. Oxygen enrichment may occur continuously, as during storage in a vented vessel, or it may occur in stages, for example, when it is moved from one location to another. Also, refrigeration of the perishable goods may occur continuously or intermittently.

Typically the liquid mixture is formed and contained in a closed vessel. The vessel may be unvented or vented, either on a continuous basis or periodically, for example, when necessary to prevent conditions in the vessel from reaching a critical state. A critical state may be, for example, when the pressure in the vessel reaches the point at which rupture of the vessel is imminent.

In a preferred embodiment of the invention, the liquid mixture is nitrogen-enriched liquefied air.

In another preferred embodiment of the invention the liquid mixture is disposed of before the oxygen concentration of the mixture reaches 22 mole percent.

In a more preferred embodiment of the invention the liquid mixture, when initially prepared, comprises at least 16 mole percent oxygen.

In another preferred embodiment, the liquid mixture is disposed of before the oxygen concentration of said mixture reaches 21 mole percent.

Upon disposal of the liquid mixture the process may be repeated by formation of an new oxygen- and nitrogen-containing liquid mixture having the above composition.

By starting the process when the oxygen concentration of the liquid mixture in the vessel is between 15 and 18 mole percent, i.e. volume percent at normal temperature and pressure (0° C. and one atmosphere, absolute) on a fully vaporized basis, the vaporized liquid mixture will support human life in closed refrigeration compartments but will not support, or will, at best, weakly support combustion in the closed compartment. By terminating use of the liquid mixture to refrigerate the compartment before the oxygen concentration of the liquid mixture reaches 22 mole percent, and preferably before the oxygen concentration of the liquid mixture reaches 21 mole percent, use of a mixture which produces an atmosphere which highly supports combustion is avoided.

BRIEF DESCRIPTION OF THE DRAWINGS

The present invention will now be more particularly described by way of example on with reference to the following drawings, in which.

DETAILED DESCRIPTION OF THE INVENTION

Figure 1:
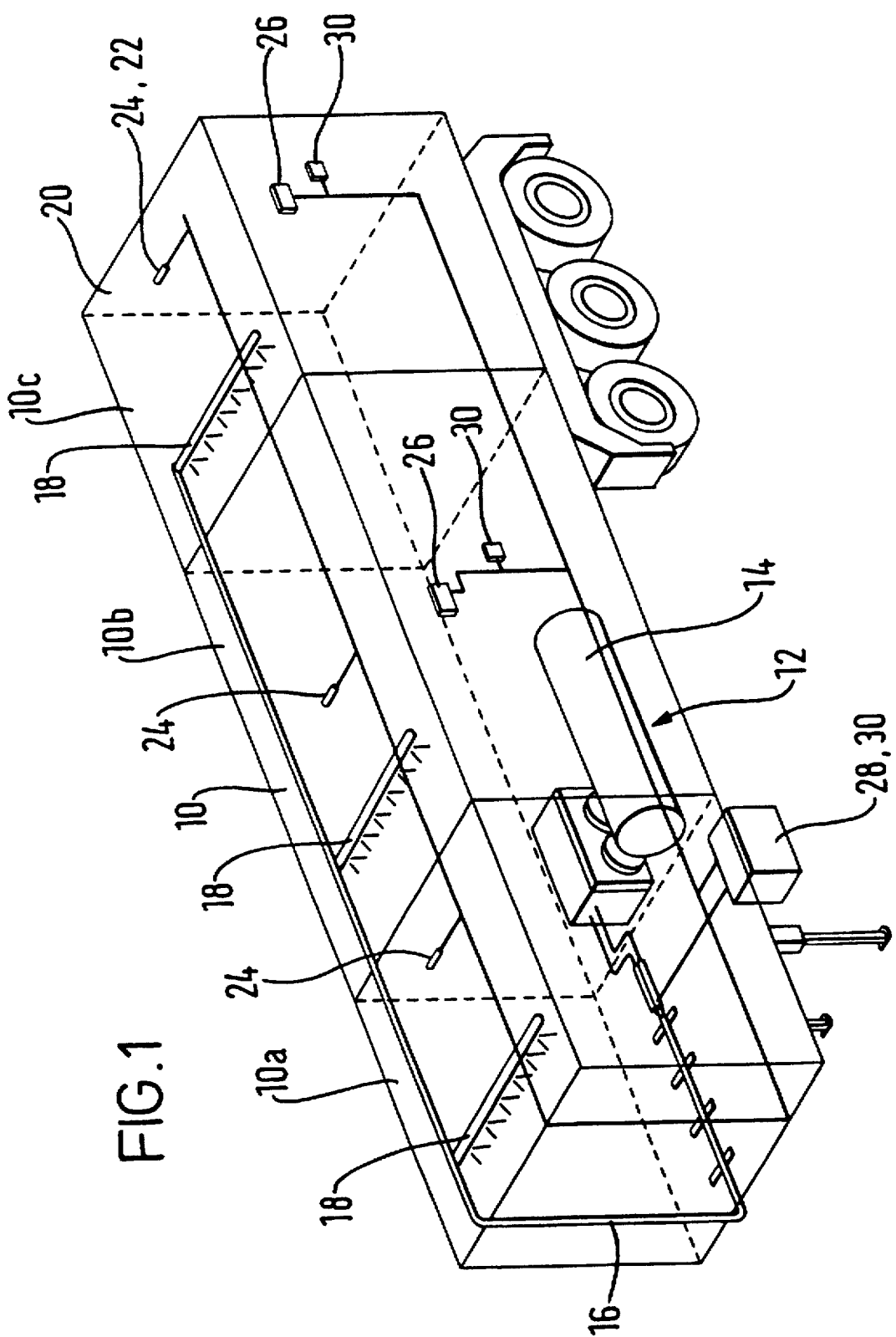
FIG. 1 is a general view of a vehicle trailer having a cryogenic refrigeration system in accordance with various aspects of the present invention.

Referring now to the drawings in general but particularly to FIG. 1, a container 10 for use in, for example, the transportation of perishable food products is provided with a cryogenic refrigeration system shown generally at 12. Components of the refrigeration system include a vacuum insulated storage tank 14, pipeline 16 and a plurality of spraybars 18 situated towards the roof 20 of the container 10. The container may be divided into a number of compartments 10a–10b by movable partitions in which case at least one spraybar 18 is provided per compartment. A control system 22 comprising a plurality of heat sensors 24, thermostats 26 and liquid cryogen flow control means 28 is provided to ensure the interior of the container 10 remains within desired temperature limitations. Thusfar, the refrigeration system 12 is conventional. The present invention, however, makes use of further, non standard, components including an atmosphere composition analyser 30 for monitoring and analysing at least the oxygen content within the container. The analyser 30 may be linked to the control system to facilitate the automatic closedown of the refrigeration process should the oxygen content of the container rise above a predetermined safe limit. Alternatively, the analyser 30 may be linked to a simple warning device so as to warn the operator of the necessity to close the system down.

Figure 2:
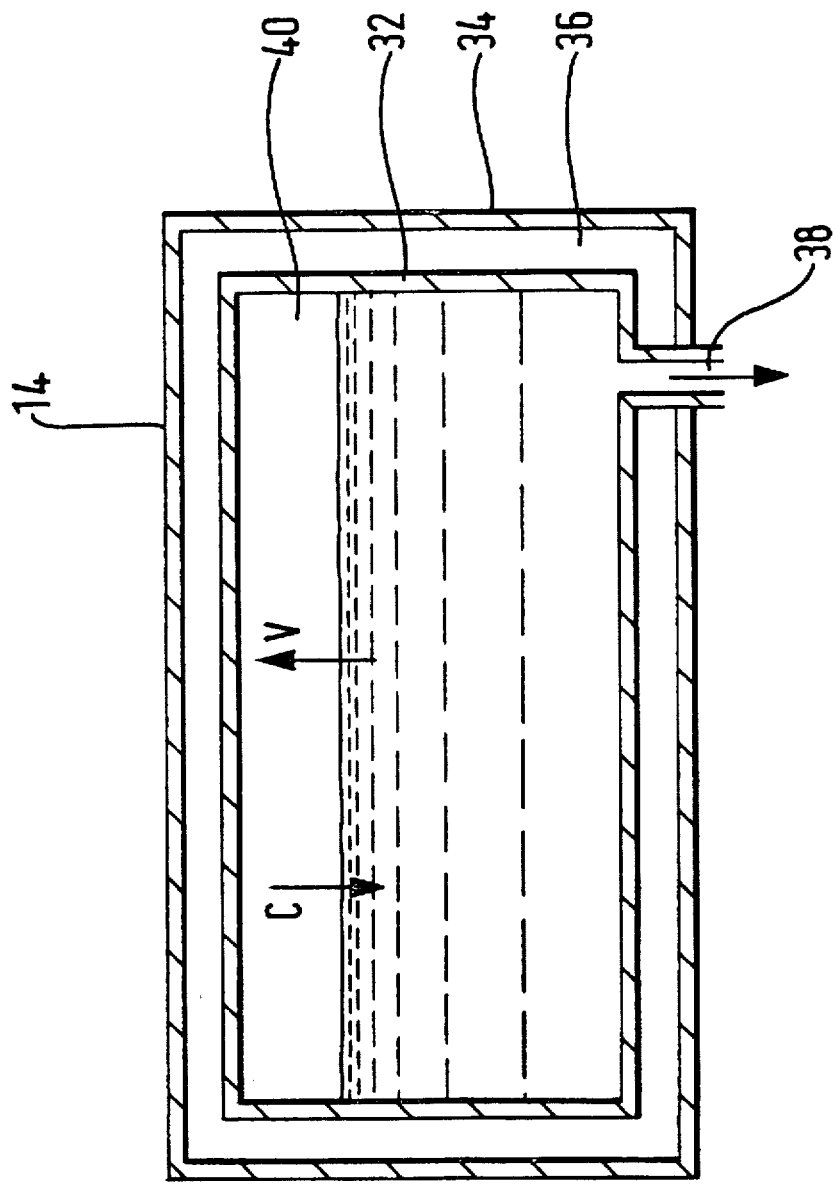
FIG. 2 is a cross sectional view of the cryogenic liquid storage tank shown in FIG. 1.

The cryogenic storage tank 14 shown in cross section in FIG. 2 comprises an inner and an outer skin 32, 34 spaced from one another by a vacuum insulating region 36. An outlet 38 communicates with pipeline 16 for the passage of liquid cryogen thereto.

In operation, tank 14 is filled with a mixture of liquid oxygen and liquid nitrogen the initial proportions of which are selected so as to produce a gas having an oxygen content of between above 18% and 22% when fully vaporised. Whilst the actual ratio of the mixture required will very much depend on the magnitude of any 'enrichment' during storage, transfer and transportation, it has been found that a mixture containing approximately 15% by weight or 20% by volume of liquid oxygen will result in an oxygen content of approximately 18% within the container after enrichment has been taken into account.

Enrichment of the cryogenic mixture will only occur when the liquid boils and is therefore a function of storage tank heating. Any heating of the tank 14 will result in the more volatile nitrogen boiling off (Arrow V) and vaporising within any headspace 40 in the tank. Such vaporisation will result in the remaining liquid becoming slightly enriched in the less volatile oxygen. Providing the tank 14 does not overpressurise and vent the vaporised atmosphere, the enrichment will be negligible. However, if in practice the liquid in the tank 14 does become excessively enriched then the remaining gas should be vented off and the tank refilled.

It will be appreciated that the magnitude of vaporisation is very much dependent upon the volume of any headspace available within the tank and hence it would be good design practice to avoid excessive headspace.

Liquid cryogen is drawn from the tank in the conventional manner and directed to spraybars 18 for release as and when desired then from in a liquid state. The control system 22 is set to maintain the interior of the container with a predetermined temperature range. Analyser 30 is set to monitor the oxygen control of the container and react so as to either shut down the chilling system or warn the operator of the impending dangers.

The percentage of oxygen present in the final vaporised form should be sufficient to enable the vehicle operator to breath when entering the container 10 but should not be so high as to present a fire hazard. In practice an oxygen concentration of between 15 and 22 percent by volume in the fully vaporised state has been found to provide sufficient oxygen to support life whist still being below that of natural air and therefore not sufficient to present an unacceptable fire hazard. Clearly, it would be desirable to provide some degree of 'safety factor' and hence an oxygen concentration of between 16 and 21 percent by volume is preferable. Most systems could be operated so as to produce an oxygen concentration of about 18 percent within the container and could use the 16 and 22 percent limits or 15 and 22 as the safety limits beyond which the atmosphere should not pass without warning signals being given from the oxygen monitor.

The following calculations are provided by way of illustrating how to determine the percentage oxygen by volume required in the liquid phase for a given percentage oxygen desired in the vapour phase.

| BASIC DATA | AT BOILING POINT | AT 0° C. |
|---|---|---|
| Density of Oxygen | 1140 kg/m³ (at -183° C.) | 1.429 kg/m³ |
| Density of Nitrogen | 808.1 kg/m³ (at -196° C.) | 1.2505 kg/m³ |

Whilst mixed liquids will boil at an intermediate temperature (at one atmosphere) these figures are sufficiently accurate for the present calculations.

EXAMPLE 1

Atmosphere Required=15% Oxygen by volume at 0° C. in Container (Remainder=$N_2$)

Assuming 100 m³ Volume

Mass of $O_2$ Required=15×1.429=21.438 kg

Mass of $N_2$ Required=85×1.2505=106.293 kg

Therefore percentage $O_2$ by weight=16.783%

Therefore the liquid will need this proportion of its mass as $O_2$

Hence, assuming a liquid load of 100 kg

The 16.783 kg of $O_2$ equates to a liquid volume of 14.722 liters and the 83.217 kg of $N_2$ equates to a liquid volume of 102.878 liters Therefore volume % of liquid $O_2$ is $$\frac{14.722}{102.978 + 14.722} = 12.508\%$$

Hence a liquid mix containing 12.508% $O_2$ by volume and the remainder being $N_2$ will produce an atmosphere containing 15% $O_2$ at 0° C. when fully vaporised, the remaining 85% being $N_2$.

EXAMPLE 2

Requiring 16% $O_2$ by Volume at 0° C.

Mass $O_2$ per 100 m³=22.864 kg

Mass $N_2$ per 100 m³=105.042 kg

Therefore % $O_2$ by weight=17.88% $O_2$
The liquid will require this proportion if is mass as $O_2$.
Assuming a 100 kg load
17.88 kg $O_2$=15.684 liters
82.12 kg N=101.62 liters
Therefore volume % of liquid $O_2$ is 13.37%

EXAMPLE 3

Requiring 18% $O_2$ by Volume at 0° C.
Mass of $O_2$ per 100 $m^3$=25.722 kg
Mass of $N_2$ per 100 $m^3$=102.541
Therefore % $O_2$ by weight=20.054%
Assuming a 100 kg load
20.054 kg $O_2$=17.59 liters
79.946 kg $N_2$=98.931 liters
Therefore Volume % of liquid $O_2$=15.09%

EXAMPLE 4

Requiring 21% $O_2$ by Volume at 0° C.
Mass of $O_2$ per 100 $m^3$=30.009 kg
Mass of $N_2$ per 100 $m^3$=98.789 kg
Therefore % $O_2$ by weight=23.30%
Assuming a liquid load of 100 kg
23.30 kg $O_2$=20.439 liters
76.70 kg $N_2$=94.91 liters
Therefore Volume % of liquid $O_2$=17.72%

EXAMPLE 5

Requiring 22% $O_2$ by Volume at 0° C.
Mass of $O_2$ per 100 $m^3$=31.438 kg
Mass of $N_2$ per 100 $m^3$=97.539 kg
Therefore % $O_2$ by weight=24.37%
Assuming a liquid load of 100 kg
24.37 kg $O_2$=21.38 liters $O_2$
75.63 kg $N_2$=93.59 liters $N_2$
Therefore Volume % of liquid $O_2$=18.60%

We claim:
1. A process comprising the steps:
   (a) forming an oxygen- and nitrogen-containing liquid mixture comprising between 15 and 18 mole percent oxygen;
   (b) subjecting said mixture to conditions which cause oxygen enrichment of the mixture;
   (c) refrigerating a perishable goods storage compartment by vaporizing said mixture thereinto while the oxygen concentration of said mixture is less than 22 mole percent.
2. The process of claim 1, wherein said oxygen enrichment occurs in stages.
3. The process of claim 1, wherein said liquid mixture is formed in a closed vessel.
4. The process of claim 3, wherein said closed vessel is vented when necessary to prevent the pressure in said vessel from reaching a critical value.
5. The process of claim 1, wherein said liquid mixture is nitrogen-enriched liquefied air.
6. The process of claim 1, wherein said liquid mixture is disposed of before the oxygen concentration of said mixture reaches 22 mole percent.
7. The process of claim 1, wherein said liquid mixture initially comprises at least 16 mole percent oxygen.
8. The process of claim 1, wherein said liquid mixture is disposed of before the oxygen concentration of said mixture reaches 21 mole percent.

* * * * *